United States Patent
Tanabe et al.

(10) Patent No.: US 8,811,985 B2
(45) Date of Patent: Aug. 19, 2014

(54) NETWORK REGISTRATION METHOD, MOBILE STATION AND SUBSCRIBER INFORMATION MANAGEMENT SERVER

(75) Inventors: Akimichi Tanabe, Kawasaki (JP); Kazuyuki Kozu, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 375 days.

(21) Appl. No.: 12/531,703

(22) PCT Filed: Mar. 19, 2008

(86) PCT No.: PCT/JP2008/055106
§ 371 (c)(1), (2), (4) Date: Nov. 5, 2009

(87) PCT Pub. No.: WO2008/114823
PCT Pub. Date: Sep. 25, 2008

(65) Prior Publication Data
US 2010/0105385 A1 Apr. 29, 2010

(30) Foreign Application Priority Data
Mar. 19, 2007 (JP) .............................. P2007-071634

(51) Int. Cl.
*H04W 4/00* (2009.01)
*H04M 1/66* (2006.01)
*H04M 1/68* (2006.01)

(52) U.S. Cl.
USPC ............... 455/435.1; 455/433; 455/432.1; 455/435.2; 455/435.3; 455/411

(58) Field of Classification Search
USPC ............. 455/433, 432.1–432.3, 435.1–435.3, 455/411
See application file for complete search history.

(56) References Cited

U.S. PATENT DOCUMENTS

| 2004/0066769 | A1* | 4/2004 | Ahmavaara et al. | 370/338 |
| 2005/0207336 | A1* | 9/2005 | Choi et al. | 370/208 |
| 2006/0246920 | A1* | 11/2006 | Shim | 455/456.2 |

(Continued)

FOREIGN PATENT DOCUMENTS

| JP | 2006-217574 A | 8/2006 |
| JP | 2007/336113 A | 12/2007 |

(Continued)

OTHER PUBLICATIONS

Singaporean Office Action for Application No. 200906140-9, mailed on Oct. 22, 2010 (7 pages).

(Continued)

*Primary Examiner* — Jinsong Hu
*Assistant Examiner* — Dung Hong
(74) *Attorney, Agent, or Firm* — Osha Liang LLP

(57) ABSTRACT

A network registration method according to the present invention includes the steps of (A) transmitting, from a mobile station (UE), an attach request; (B) notifying, at a subscriber information management server (HSS), a switching apparatus of external network identification information which is identification information of an external network associated with the mobile station (UE) having transmitted the attach request; (C) setting up, at the switching apparatus, a bearer between a gateway apparatus and the mobile station on the basis of the notified external network identification information; (D) allocating, at the gateway apparatus, address information with which the mobile station connects to the external network, to the mobile station; and (E) notifying, at the switching apparatus, the external network identification information and the address information, to the mobile station (UE).

10 Claims, 7 Drawing Sheets

(56) References Cited

U.S. PATENT DOCUMENTS

2007/0097879 A1* 5/2007 Bleckert et al. ............... 370/254
2009/0047947 A1* 2/2009 Giaretta et al. ............ 455/432.1
2011/0035495 A1* 2/2011 Ekstrom et al. ............... 709/225

FOREIGN PATENT DOCUMENTS

| WO | 2005/064958 A1 | 7/2005 |
| WO | 2005/104480 A2 | 11/2005 |
| WO | 2006/118373 A1 | 11/2006 |

OTHER PUBLICATIONS

International Search Report w/translation from PCT/JP2008/055106 dated May 1, 2008 (5 pages).
Written Opinion from PCT/JP2008/055106 dated May 1, 2008 (5 pages).
Patent Abstracts of Japan; Publication No. 2007-336113 dated Dec. 27, 2007; NEC Corp. (1 page).
3GPP TSG-SA WG2 Meeting #56 ad-hoc; S2-071261; "The principle of LTE attach"; NTT DoCoMo, Inc.; Warsaw, Poland; Mar. 26-30, 2007 (3 pages).
3GPP TSG SA WG2 Architecture—S2#56; S2-070077; "Requirement Clarification on Re-attachment under MME/UPE Pool Concept"; Huawei et al.; Florence, Italy; Jan. 15-19, 2007 (7 pages).
3GPP TS 23.401 V0.2.0; "CPRS enhancements for LTE access"; Feb. 2007 (15 pages).
3GPP TR 23.882 V1.8.0; "Report on Technical Options and Conclusions"; Feb. 2007 (181 pages).
Japanese Office Action for Application No. 2009-505241, mailed on Feb. 8, 2011 (7 pages).
3GPP TR 23.882 V1.0.0; 3rd Generation Partnership Project; Techincal Specification Group Services and System Aspects; 3GPP System Architecture Evolution: Report on Technical Options and Conclusions (Release 7) Mar. 2006.
Patent Abstracts of Japan for Japanese Publication No. 2006-217574, publication date Aug. 17, 2006 (1 page).
Office Action for Chinese Patent Application No. 200880009140.8 issued Mar. 30, 2012, with English translation thereof (12 pages).
Office Action for Russian Application No. 2009136529/07 mailed Mar. 2, 2012, with English translation thereof (12 pages).
Extended European Search Report for European Application No. 08722481.2 dated May 16, 2012 (8 pages).
3GPP TSG SA WG2 Architecture—S2#56, S2-070356 "New Attach Procedure with Agreement on S5a"; Florence, Italy, Jan. 15, 2007 (5 pages).
3GPP TSG SA WG2 Architecture—S2#56b Rel-8 Ad-hoc, S2-070774; "Initial Attach Procedure from Evolved RAN"; St. Louis, Missouri, Feb. 12, 2007 (5 pages).
3GPP TSG SA WG2 Architecture—S2#56, S2-070081; "The Attach Information Flow with MME/UPE Separation"; Florence, Italy, Jan. 15, 2007 (6 pages).
Office Action for Australian Patent Application No. 2008227506, mailing date Dec. 21, 2012 (4 pages).
Notice of Grounds for Rejection in corresponding Korean application No. 10-2009-7019367 dated Jun. 5, 2013 (8 pages).

* cited by examiner

| Default-APN | UE-IP ADDRESS | SAE BEARER ID |
|---|---|---|
| IMS | #a1<br>#a2 | #0<br>#1 |
| i MODE | #b | #0 |
| COMPANY | #c | #0 |

NETWORK REGISTRATION METHOD, MOBILE STATION AND SUBSCRIBER INFORMATION MANAGEMENT SERVER

TECHNICAL FIELD

The present invention relates to a network registration method in which a mobile station performs a registration procedure to a communication network including a switching apparatus and a subscriber information management server, and also relates to the mobile station and the subscriber information management server.

BACKGROUND ART

Heretofore, GPRS (General Packet Radio Service) standardized by the 3GPP has been known as a technique to perform communications with an external network (PDN: Packet Data Network, for example) by using a cellular phone network.

GPRS is specified such that an "MM (Mobility Management) procedure" and an "SM (Session Management) procedure" are processed in series.

For this reason, in the GPRS, when starting communications with an external network (PDN), the user first needs to perform a registration procedure (attach procedure) to a communication network by using the MM procedure, and then to connect to the external network (PDN) by using the SM procedure.

In this manner, GPRS poses a problem that it takes a long period of time for the user to actually complete the establishment of a connection to an external network (PDN) after initiating a process to start communications with the external network (PDN).

Meanwhile, as for the "SAE (System Architecture Evolution)" whose standardization is currently under way in the 3GPP, there has been studied a method of shortening the connection delay described above and providing in a pseudo manner a state where the user can transmit and receive an IP packet at any time ("Always On").

In the SAE, a scheme is proposed in which the establishment of a connection to an external network (Default IP Service) is completed while the user performs an attach procedure to a communication network, the attach procedure being specified in the "LTE (Long Term Evolution)" (See Non-patent Document 1).

This scheme will be described with reference to FIG. 1.

As shown in FIG. 1, when an RRC (Radio Resource Control) connection is established between a mobile station UE and a radio base station eNB in Step S2001, the mobile station UE transmits an attach request to a switching apparatus MME (Mobility Management Entity) and a serving SAE-GW, in order to perform a registration procedure to a communication network (a communication network specified in the LTE), in Step S2002.

In Step S2003, a process for authenticating the mobile station UE is performed among the mobile station UE, the switching apparatus MME, the serving SAE-GW, and a subscriber information management server HSS (Home Subscriber Server).

In Step S2004, the switching apparatus MME and the serving SAE-GW transmit "Update Location" to the subscriber information management server HSS, "Update Location" notifying the subscriber information management server HSS of location information of the mobile station UE.

In Step S2005, the subscriber information management server HSS transmits subscriber information of the mobile station UE to the switching apparatus MME and serving SAE-GW.

In Step S2006, a U-plane transmission path (route) is established between the mobile station UE and a gateway apparatus PDN serving SAE-GW for an external network (PDN).

In Step S2007, an IP bearer is set up between the radio base station eNB, the switching apparatus MME and the serving SAE-GW.

In Step S2008, the switching apparatus MME and the serving SAE-GW transmit an attach response for notifying the mobile station UE of the completion of the registration procedure to the communication network, to the mobile station UE.

Non-patent Document 1: 3GPP TR23.882-180 Section 7.13.2

Non-patent Document 2: 3GPP TS23.401-020

DISCLOSURE OF THE INVENTION

However, the scheme proposed above is not specified as to how to select an external network (PDN) to be connected and the gateway apparatus PDN SAE-GW for the external network, in the attach procedure (registration procedure) to a communication network.

Meanwhile, the scheme described above is described such that the attach request transmitted by the mobile station UE in Step S2002 may include an "APN (Access Point Name)" specifying an external network (Default IP Service) to be connected. However, such inclusion has a problem of causing a security flaw due to transmission of information on an external network in connection before establishment of security because an authentication process is not yet completed between the mobile station UE and a communication network (including the radio base station eNB, the switching apparatus MME and the SAE-GW).

Moreover, according to the specification of the scheme described above, a U-plane transmission path is set up between the mobile station UE and the gateway apparatus PDN SAE-GW for an external network (PDN) in an attach procedure to a communication network. However, if a U-plane transmission path in the attach procedure is set up for a mobile station which does not start communications immediately, the U-plane transmission path causes a problem of unnecessarily occupying radio resources.

The present invention has been made in consideration of the above problems, and has an objective to provide a network registration method, a mobile station and a subscriber information management server which make it possible to quickly and safely start communications with an external network by completing a connection establishment to the external network without unnecessarily occupying radio resources in a registration procedure to a communication network.

A first aspect of the present invention is summarized as a network registration method in which a mobile station performs a registration procedure to a communication network including a switching apparatus and a subscriber information management server, the network registration method including the steps of: (A) transmitting, from the mobile station to the communication network, an attach request for starting the registration procedure; (B) notifying, at the subscriber information management server, the switching apparatus of external network identification information which is identification information of an external network associated with the mobile station having transmitted the attach request; (C) setting up, at the switching apparatus, a bearer between a gateway apparatus connected to the external network and the mobile station on the basis of the notified external network identification information; (D) allocating, at the gateway apparatus, address information with which the mobile station connects to the external network, to the mobile station; and (E) notifying, at the switching apparatus, the external network identification information and the address information, to the mobile station.

In the first aspect, in the step (B), the subscriber information management server can notify the switching apparatus of a plurality of pieces of external network identification information; in the step (C), the switching apparatus can set up a bearer between the mobile station and each of a plurality of the gateway apparatuses respectively connected to a plurality of the external networks specified by the respective pieces of external network identification information thus notified; in the step (D), each of the plurality of gateway apparatuses can respectively allocate a piece of address information with which the mobile station connects to the corresponding one of the external networks, to the mobile station; and in the step (E), the switching apparatus can notify the mobile station of the plurality of pieces of external network identification information and the pieces of address information.

In the first aspect, in the step (C), the switching apparatus can set up different bearers for respective types of communications to be performed by the mobile station.

In the first aspect, in the step (E), the switching apparatus can notify the mobile station of the external network identification information and the address information through an attach response to the attach request.

In the first aspect, in the step (B), the subscriber information management server can determine the number or type of the pieces of external network identification information to be notified to the switching apparatus, depending on an ability of the mobile station.

In the first aspect, in the step (B), the subscriber information management server can determine the number or type of the pieces of external network identification information to be notified to the switching apparatus, depending on terms and conditions of a contract of the mobile station.

A second aspect of the present invention is summarized as a mobile station configured to perform a registration procedure to a communication network including a switching apparatus, the mobile station including: an attach request transmitter unit configured to transmit an attach request to start the registration procedure to the communication network; a communication information acquirer unit configured to acquire external network identification information which is identification information of an external network associated with the mobile station and address information associated with the mobile station from the switching apparatus, in the registration procedure to the communication network; and a communicator unit configured to communicate with the external network by using the address information via a bearer set up between the mobile station and a gateway apparatus connected to the external network.

In the second aspect, in the registration procedure to the communication network, the communication information acquirer unit can be configured to acquire a plurality of pieces of external network identification information for respectively identifying a plurality of external networks associated with the mobile station and a plurality of pieces of address information associated with the mobile station, from the switching apparatus; and by using one of the pieces of address information for one piece of external network identification information selected from the plurality of pieces of external network identification information, the communicator unit can be configured to communicate with the selected external network via a bearer set up between the mobile station and the gateway apparatus connected to the selected external network.

In the second aspect, a plurality of different bearers can be set up for respective types of communications to be performed with the gateway apparatus by the mobile station; in the registration procedure to the communication network, the communication information acquirer unit can be configured to further acquire a plurality of pieces of bearer identification information for respectively identifying the plurality of bearers, from the switching apparatus; and the communicator unit can be configured to communicate with the external network via a bearer specified by one piece of bearer identification information selected from the plurality of pieces of bearer identification information in accordance with the type of communications.

A third aspect of the present invention is summarized as a subscriber information management server used in a mobile communication system in which a mobile station performs a registration procedure to a communication network including a switching apparatus by transmitting an attach request, the subscriber information management server including: a manager unit configured to store the mobile station and external network identification information which is identification information of an external network in association with each other; and a transmitter unit configured to notify the switching apparatus of the external network identification information associated with the mobile station having transmitted the attach request; wherein the transmitter unit is configured to determine the number or type of pieces of the external network identification information to be notified to the switching apparatus, depending on an ability of the mobile station.

A fourth aspect of the present invention is summarized as a subscriber information management server used in a mobile communication system in which a mobile station performs a registration procedure to a communication network including a switching apparatus by transmitting an attach request, the subscriber information management server including: a manager unit configured to store the mobile station and external network identification information which is identification information of an external network in association with each other; and a transmitter unit configured to notify the switching apparatus of the external network identification information associated with the mobile station having transmitted the attach request; wherein the transmitter unit is configured to determine the number or type of pieces of the external network identification information to be notified to the switching apparatus, depending on terms and conditions of a contract of the mobile station.

As described above, the present invention can provide a network registration method, a mobile station and a subscriber information management server which make it possible to quickly and safely start communications with an external network by completing a connection to the external network without unnecessarily occupying radio resources in a registration procedure to a communication network.

BEST MODE FOR CARRYING OUT THE INVENTION

Configuration of Mobile Communication System According to First Embodiment of Present Invention Referring to FIGS. 2 to 6, a configuration of a mobile communication system according to a first embodiment of the present invention will be described.

Figure 1:
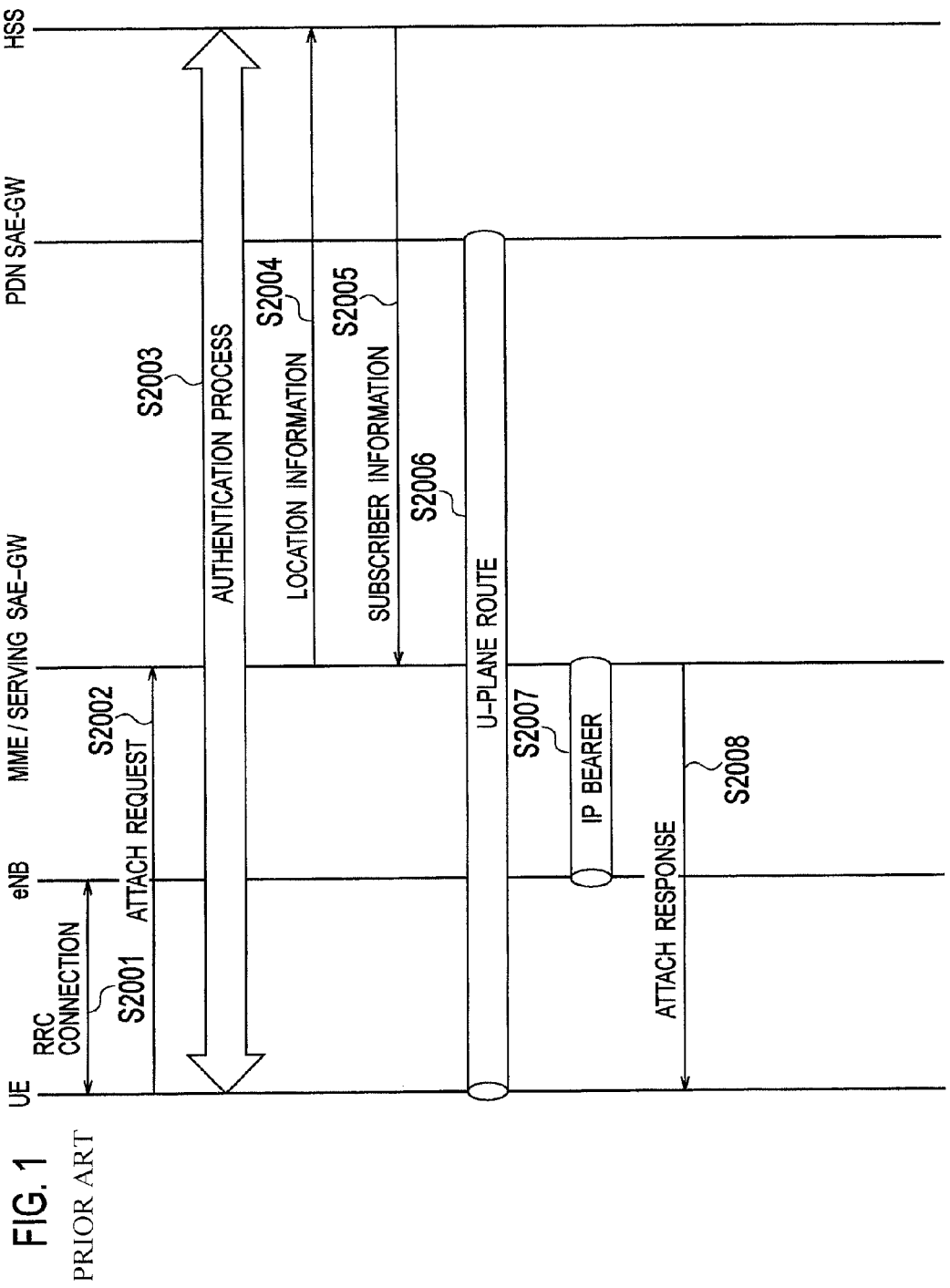
FIG. 1 is a sequence diagram showing an operation of a mobile communication system according to a conventional technique.
Figure 2:
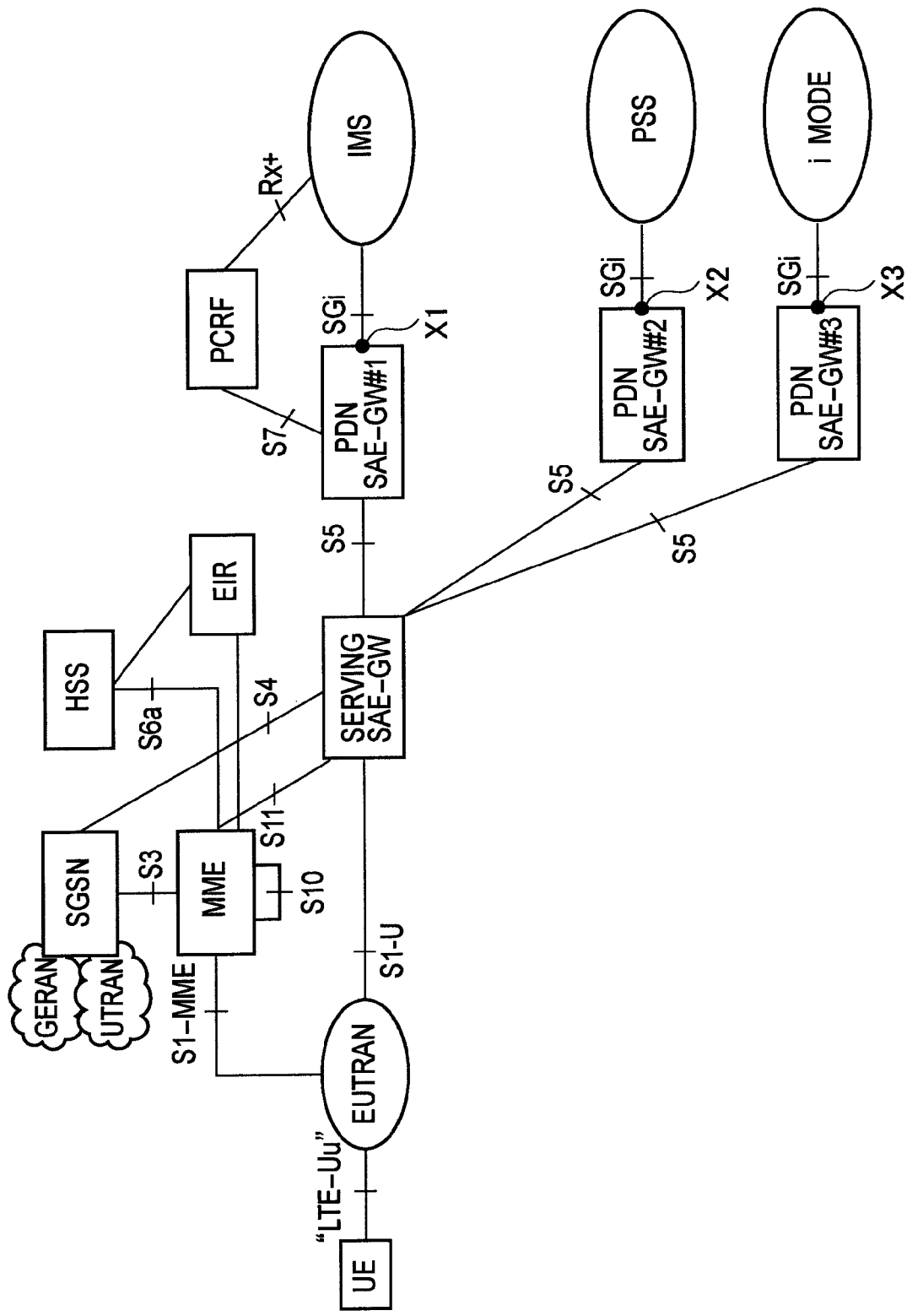
FIG. 2 is a diagram showing the overall configuration of the mobile communication system according to a first embodiment of the present invention.

As shown in FIG. 2, the mobile communication system according to this embodiment includes: an MME; a serving SAE-GW; an HSS; an EIR (Equipment Identity Register); and multiple PDN SAE-GWs #1 to #3, in a communication network.

Further, in the mobile communication system according to this embodiment, an EUTRAN (Evolved Universal Terrestrial Radio Access Network), which is an access network, is connected to a mobile station UE via an LTE-Uu interface, is connected to the MME via an S1-MME interface, and is connected to the serving SAE-GW via an S1-U interface.

Furthermore, in the mobile communication system according to this embodiment, the PDN SAE-GW #1 is connected to an IMS (IP Multimedia Subsystem) network which is an external network via an SGi interface; the PDN SAE-GW #2 is connected to a PSS (Packet-switched Streaming Service) network which is an external network via another SGi interface; the PDN SAE-GW #3 is connected to an i-mode (registered trademark) network which is an external network via still another SGi interface.

Note that, X1 denotes an IP address (address information) which is allocated by the PDN SAE-GW #1 and with which the mobile station UE connects to the IMS network; X2 denotes an IP address (address information) which is allocated by the PDN SAE-GW #2 and with which the mobile station UE connects to the PSS network; X3 denotes an IP address (address information) which is allocated by the PDN SAE-GW #3 and with which the mobile station UE connects to the i-mode (registered trademark) network.

Figure 3:
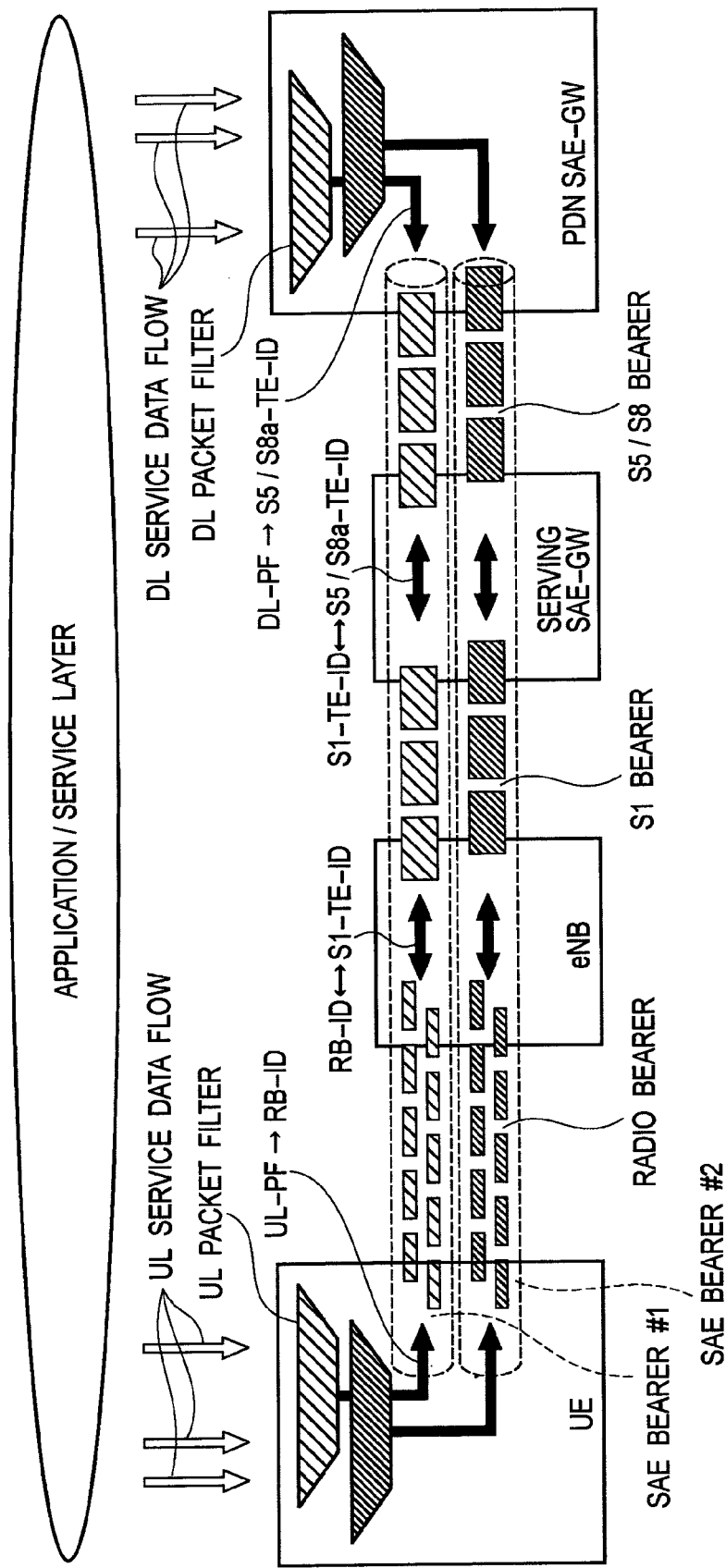
FIG. 3 is a diagram showing a structure of bearers in the mobile communication system according to the first embodiment of the present invention.

As shown in FIG. 3, the mobile communication system according to this embodiment is configured to set up a radio bearer (RB) between the mobile station UE and a radio base station eNB in the EUTRAN, to set up an S1 bearer (RAB: Radio Access Bearer) between the radio base station eNB and the serving SAE-GW, and to set up an S5/S8 bearer between the serving SAE-GW and each PDN SAE-GW.

A bearer which is set up between the mobile station UE and each PDN SAE-GW is configured to be set up for each type of communications (QoS) and for each external network (APN) to be connected.

The MME is a switching apparatus which processes a control signal, while the serving SAE-GW is a switching apparatus which processes user data from the mobile station UE. Hence, the MME and the serving SAE-GW may be collectively used as a switching apparatus (MME/serving SAE-GW) in the mobile communication system.

Note that, in this embodiment, although descriptions will be given while citing a mobile communication system equipped with LTE/SAE architecture whose standardization has been under way in the 3GPP, as shown in FIG. 2, the present invention is not limited to such a mobile communication system, and may be applied to a mobile communication system equipped with other architecture.

Figures 4, 5:
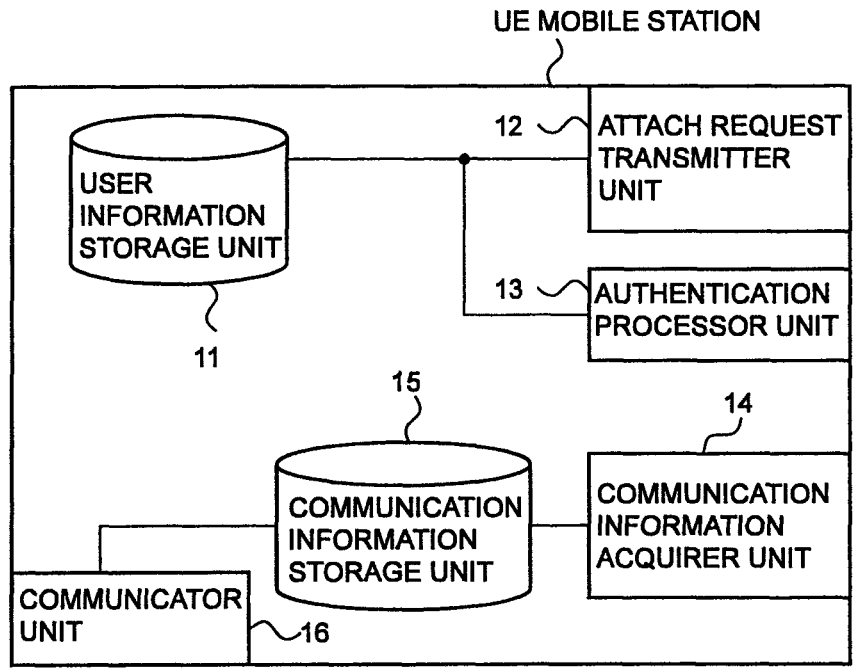
FIG. 4 is a functional block diagram of a mobile station according to the first embodiment of the present invention.
FIG. 5 is a diagram showing an example of communication information stored in a communication information storage of the mobile station according to the first embodiment of the present invention.

As shown in FIG. 4, the mobile station UE includes a user information storage unit 11, an attach request transmitter unit 12, an authentication processor unit 13, a communication information acquirer unit 14, a communication information storage unit 15, and a communicator unit 16.

The user information storage unit 11 is configured to store user information including a subscriber identifier IMSI (International Mobile Subscriber Identifier), IMEI (International Mobile Equipment Identifier) which are used for identifying the mobile station UE, and the like.

The user information storage unit 11 may be formed of a USIM (Universal Subscriber Identity Module) card which is inserted into the mobile station UE, for example.

The attach request transmitter unit 12 is configured to transmit an attach request for starting a registration procedure to a communication network. Note that, such an attach request does not include any information for identifying an external network to which the mobile station UE desires to connect.

The authentication processor unit 13 is configured to perform a process for authenticating the mobile station UE (the MME and the HSS) with the MME and the HSS.

In the registration procedure (attach procedure) to a communication network, the communication information acquirer unit 14 is configured to acquire external network identification information (Default-APN) for identifying an external network associated with the mobile station UE and address information (UE-IP address) of the mobile station UE, from the MME, and to store the acquired information in the communication information storage unit 15.

In the registration procedure (attach procedure) to a communication network, alternatively, the communication information acquirer unit 14 may be configured to acquire multiple pieces of external network identification information (Default-APNs) and multiple pieces of address information (UE-IP addresses) of the mobile station UE, from the MME.

In the registration procedure (attach procedure) to a communication network, the communication information acquirer unit 14 is configured to further acquire pieces of bearer identification information (SAE bearer IDs) for respectively identifying multiple bearers, from the MME. Note that such bearer identification information (SAE bearer ID) is allocated by the MME.

The communication information storage unit 15 is configured to store, for example, communication information including the "Default-APN", the "UE-IP address", the "SAE bearer ID" and the like, as shown in FIG. 5.

The "Default-APN" is external network identification information for identifying an external network which is associated with the mobile station UE by the HSS. The "UE-IP address" is address information (such as an IP address) with which the mobile station UE connects to the external network and which is allocated to the mobile station UE by the corresponding PDN SAE-GW. The "SAE bearer ID" is bearer information for identifying an S5/S8 bearer which is set between the serving SAE-GW and the PDN SAE-GW and which is used when the mobile station UE communicates with the external network.

As shown in FIG. 3, one external network may be associated with multiple pieces of address information and bearer identification information.

The communicator unit 16 is configured to communicate with an external network (such as the IMS network or the PSS network) via a bearer (S5/S8 bearer, PMIP (Proxy Mobile IP) tunnel) set between the serving SAE-GW and the corresponding PDN SAE-GW, by using address information (IP address) stored in the communication information storage unit 15.

When multiple pieces of external network identification information (Default-APNs) are stored in the communication information storage unit 15, the communicator unit 16 is configured to use address information (UE-IP address) for a piece of external network identification information selected from the multiple pieces of external network identification information, and thereby to communicate with the external network thus selected via an S5/S8 bearer set between the serving SAE-GW and the PDN SAE-GW connected to the selected external network.

When multiple different bearers are set between the serving SAE-GW and each PDN SAE-GW for the respective types of communications (QoS, for example) to be performed by the mobile station UE, the communicator unit 16 is configured to communicate with an external network via a bearer specified by bearer identification information selected from multiple pieces of bearer identification information (SAE bearer IDs) stored in the communication information storage unit 15 in accordance with the type of communications to be performed with the external network.

Figure 6:
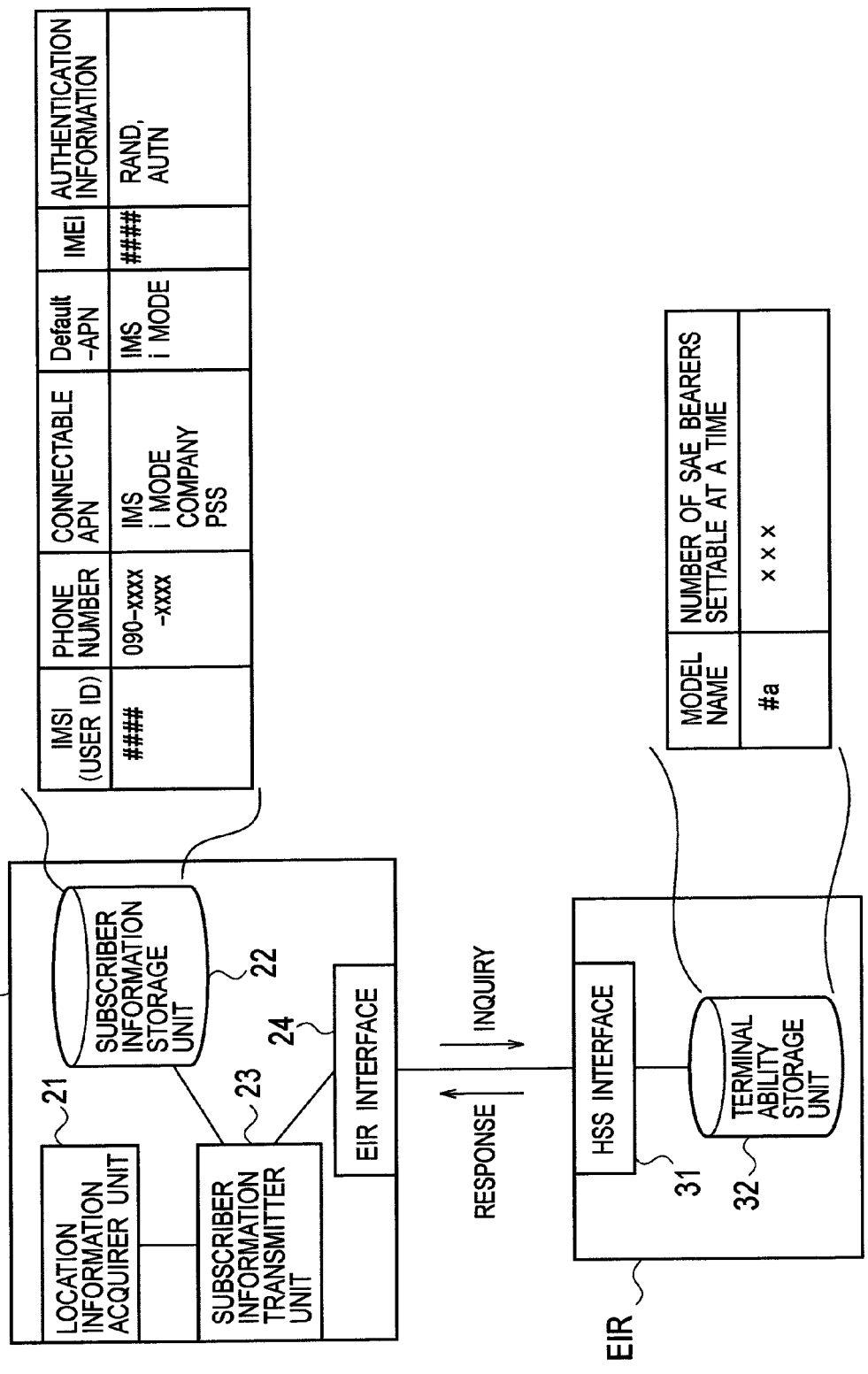
FIG. 6 is a functional block diagram of an HSS and an EIR according to the first embodiment of the present invention.

As shown in FIG. 6, the HSS includes a location information acquirer unit 21, a subscriber information storage unit 22, a subscriber information transmitter unit 23, and an EIR interface 24.

The location information acquirer unit 21 is configured to acquire location information of the mobile station UE included in an "Update Location" transmitted from the MME, and to register the location information of the mobile station UE in a communication network.

The subscriber information storage unit 22 is configured to store therein subscriber information including, for example, an "IMSI", a "phone number", a "connectable APN", a "Default-APN (APN List, for example)", an "IMEI", "authentication information" and the like.

The "IMSI" is a subscriber identifier for identifying a mobile station UE; the "phone number" is a phone number which is allocated to the mobile station UE; the "connectable APN" is external network identification information for identifying an external network which is connectable to the mobile station UE; the "Default-APN" is external network identification information for identifying an external network which performs a connection preparation process (such as an S5/S8 bearer setting process and an IP address allocation process) when the mobile station UE performs an attach procedure; the "IMEI" is identification information with which an ability of the mobile station UE can be specified; and the "authentication information" is information used for an authentication process of the mobile station UE.

The subscriber information transmitter unit 23 is configured to acquire subscriber information of the mobile station UE from the subscriber information storage unit 22, upon acquisition of the location information of the mobile station UE, and to transmit the subscriber information to the MME.

The subscriber information transmitter unit 23 may be configured to transmit information (IMSI) for identifying the mobile station UE and external network identification information (Default-APN) for identifying an external network associated with the mobile station UE, as the subscriber information of the mobile station UE.

Moreover, the subscriber information transmitter unit 23 may be configured to determine the number or type of the pieces of external network identification information (subscriber information) to be notified to the MME, depending on the ability of the mobile station UE.

Concretely, the subscriber information transmitter unit 23 is configured to notify the EIR of the IMEI of the mobile station through the EIR interface 24, and thereby to acquire the number of SAE bearers which the mobile station UE can set at a time.

Further, the subscriber information transmitter 23 may be configured to determine the number or type (such as a type in which voice calls are not permitted) of the pieces of external network identification information (subscriber information) to be notified to the MME, in accordance with terms and conditions of a contract of the mobile station UE.

The EIR includes an HSS interface 31 and a terminal ability storage unit 32.

The terminal ability storage unit 32 is configured to store a "model name" and the "number of SAE bearers settable at a time" in association with each other. The "model name" is information for specifying the model of the mobile station UE, and is formed of a part of the IMEI.

the HSS interface 31 is configured to acquire the "number of SAE bearers settable at a time" associated with the "model name" formed of a part of an "IMEI", from the terminal ability storage unit 32, when receiving an inquiry including the "IMEI" from the HSS, and to transmit the "number of SAE bearers settable at a time" to the HSS as a response to the inquiry.

(Operation of Mobile Communication System According to First Embodiment of Present Invention)

Figure 7:
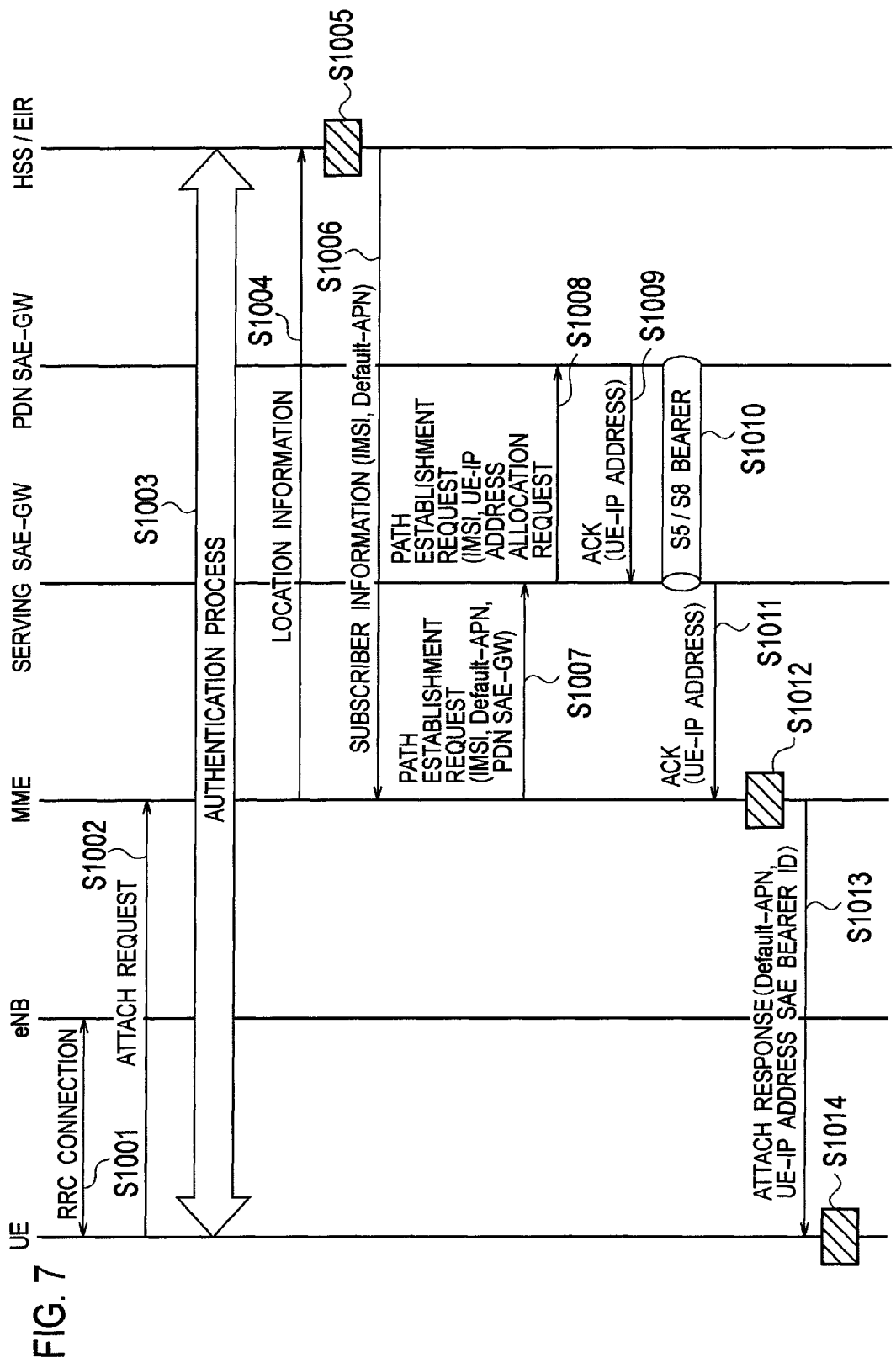
FIG. 7 is a sequence diagram showing an operation of the mobile communication system according to the first embodiment of the present invention.
Figure 8:
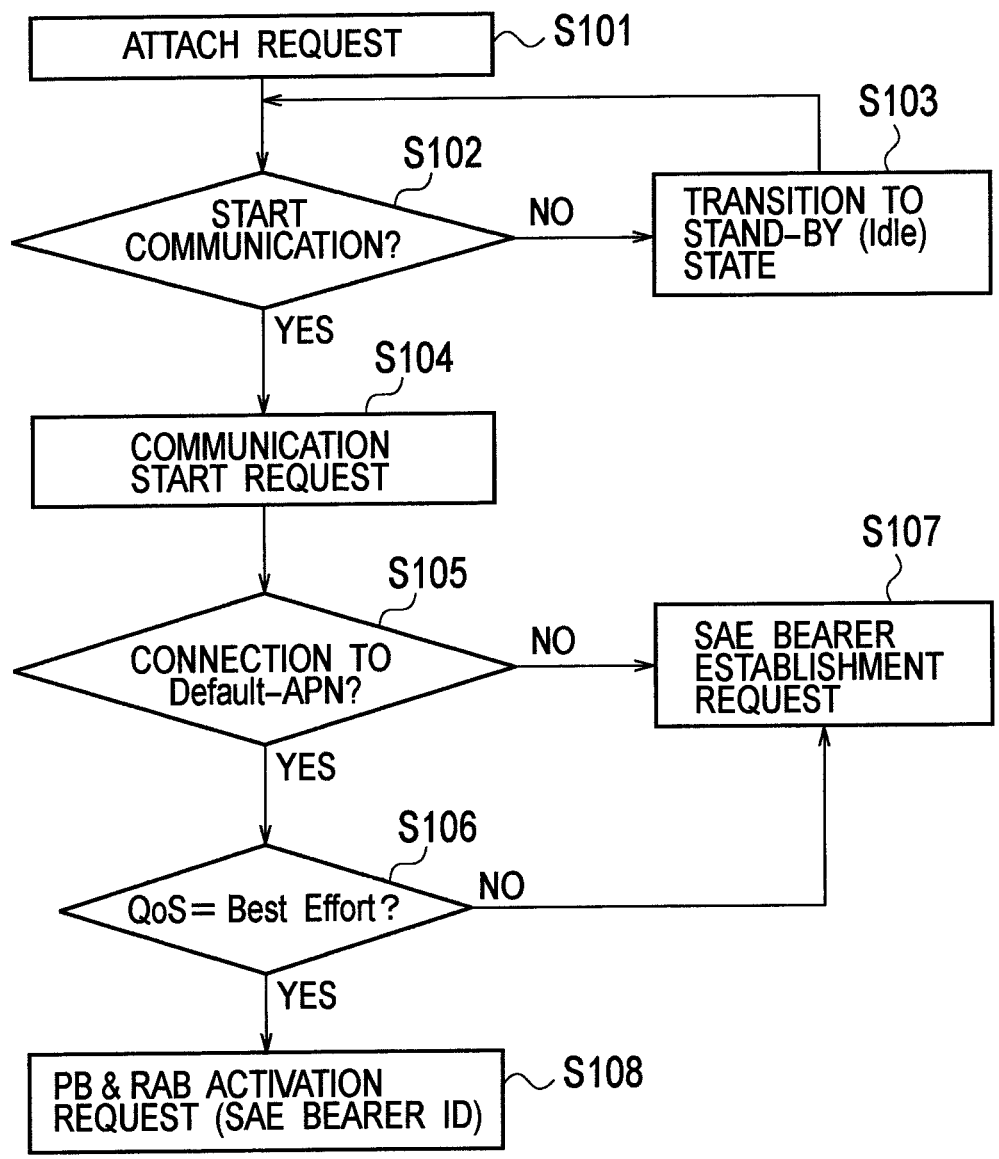
FIG. 8 is a flowchart showing an operation of the mobile station according to the first embodiment of the present invention.

Referring to FIGS. 7 and 8, an operation of the mobile communication system according to the first embodiment of the present invention will be described.

Firstly, with reference to FIG. 7, a description will be given of an operation of the mobile communication system according to this embodiment in an attach procedure to a communication network performed by the mobile station UE.

As shown in FIG. 7, when an RRC connection is established between the mobile station UE and the radio base station eNB, in Step S1001, the mobile station UE transmits an attach request to the MME in order to perform the attach procedure to the communication network, in Step S1002.

In Step S1003, a process for authenticating the mobile station UE (the MME and the HSS) is performed among the mobile station UE, the MME and the HSS.

In Step S1004, the MME transmits an "Update Location" for notifying the HSS of location information of the mobile station UE, to the HSS.

In Step S1005, the HSS extracts information "Default-APN" for identifying an external network associated with the mobile station UE.

In Step S1006, the HSS transmits subscriber information to the MME, the subscriber information including the "IMSI" and "Default-APN" of the mobile station UE.

In Step S1007, the MME transmits a path establishment request to the serving SAE-GW, the path establishment request including the "IMSI" and "Default-APN" of the mobile station UE, and "identification information for identifying a PDN SAE-GW (a gateway apparatus connected to the external network)".

In Step S1008, the serving SAE-GW transmits a path establishment request to the PDN SAE-GW specified by the "identification information for identifying a PDN SAE-GW", the path establishment request including the "IMSI" of the mobile station UE and requesting allocation of an IP address to the mobile station.

In this respect, if the multiple "Default-APNs" and the multiple "pieces of identification information for respectively identifying PDN SAE-GWs" are included in the path establishment request thus received, the serving SAE-GW transmits the path establishment request described above to the multiple PDN SAE-GWs specified by the "pieces of identification information for respectively identifying PDN SAE-GWs."

In Step S1009, the PDN SAE-GW allocates an IP address (UE-IP address) to the mobile station UE, and transmits an ACK including the allocated "UE-IP address" to the serving SAE-GW.

In Step S1010, an S5/S8 bearer is set up between the PDN SAE-GW and the serving SAE-GW. This setting allows a bearer to be set up between the PDN SAE-GW and the mobile station. Here, such a bearer is set up in a way that the MME allocates an "SAE bearer ID" to the mobile station. In other words, as shown in FIG. 3, the MME can set up a bearer (a Default bearer, for example) between the PDN SAE-GW and the mobile station.

Note that, when transmitting the above-mentioned path establishment request to the multiple PDN SAE-GWs, in Step S1008, the serving SAE-GW sets up an S5/S8 bearer with each of the multiple PDN SAE-GWs. In other words, a bearer is set up between each of the multiple PDN SAE-GWs and the mobile station.

In Step S1011, the serving SAE-GW transmits an ACK including at least one "UE-IP address" to the MME.

In Step S1012, the MME stores at least one piece of information associating the "IMSI" of the mobile station UE with the "UE-IP address", the "identification information for identifying the aforementioned serving SAE-GW," and the "identification information for identifying the aforementioned PDN SAE-GW".

In Step S1013, the MME transmits an attach response including the "Default-APN", the "UE-IP address" and the "SAE bearer ID" of the mobile station UE, to the mobile station UE.

Note that, the MME may separately transmit the "Default-APN", the "UE-IP address" and the "SAE bearer ID" of the mobile station UE to the mobile station UE after transmitting the attach response.

In Step S1014, the mobile station UE stores the "Default-APN", the "UE-IP address" and the "SAE bearer ID" thus received in the communication information storage unit 15.

Secondly, with reference to FIG. 8, a description will be given of an operation of the mobile station UE according to this embodiment after an attach procedure to a communication network is completed. Here, after the attach procedure is completed, only an S5/S8 bearer for best-effort type communications is set up between the serving SAE-GW and the PDN SAE-GW.

As shown in FIG. 8, when the attach procedure to the communication network is completed in Step S101, it is determined whether or not the mobile station UE subsequently starts communications in Step S102.

When it is determined not to start communications, the mobile station UE transitions to and stays in a stand-by (idle) state in Step S103 until it is determined to start communications.

On the other hand, when it is determined to start communications, the mobile station UE transmits a communication start request to the communication network in Step S104.

When it is determined in Step S105 that the communication start request is for communications with the external network specified by the Default-APN, it is determined whether or not the QoS of the communications is of "best-effort type" in Step S106.

When it is determined that the QoS of the communications is of "best-effort type", in Step S108 the mobile station UE specifies the "SAE bearer ID" stored in the communication information storage unit 15, and makes a request for setting a radio bearer and an S1 bearer (RAB) to thereby start communications with the external network.

On the other hand, when it is determined in Step S105 that the communication start request is not for communications with the external network specified by the Default-APN, or when it is determined in Step S106 that the QoS of the communications is not of "best-effort type", the mobile station UE makes a request for setting an SAE bearer between the mobile station UE and a PDN SAE-GW connected to the external network to be connected, as in a "PDP context activation" procedure in GPRS, in Step S107.

(Operations and Effects of Mobile Communication System According to First Embodiment of Present Invention)

With the mobile communication system according to the first embodiment of the present invention, when the mobile station UE performs an attach procedure to a communication network, an S5/S8 bearer for the Default IP Service is set up without lowering a security level. Thereby, it is possible to implement a method of providing in a pseudo manner a state where the user can transmit and receive an IP packet at any time ("Always On").

Moreover, with the mobile communication system according to the first embodiment of the present invention, multiple S5/S8 bearers for the Default IP Service can be set up in the attach procedure.

In addition, with the mobile communication system according to the first embodiment of the present invention, the number or type of S5/S8 bearers for the Default IP Service to be set up in the attach procedure can be controlled while taking into consideration the ability of the mobile station UE and terms and conditions of a contract thereof.

Additionally, with the mobile communication system according to the first embodiment of the present invention, only an S5/S8 bearer (path) in a core network is set up in the attach procedure. Thus, a wireless resource is not allocated to the mobile station UE which will not perform communications successively after the attach procedure is completed. Consequently, radio resources can be utilized efficiently.

Further, with the mobile communication system according to the first embodiment of the present invention, a communication network (MME) notifies the mobile station UE of a Default-APN every time the attach procedure is performed. Thus, a USIM specification in the mobile station UE does not need to be changed. Incidentally, the current USIM does not hold a Default-APN.

Furthermore, with the mobile communication system according to the first embodiment of the present invention, a Default-APN is shared between the mobile station UE and a communication network. This allows the mobile station UE to determine whether only a bearer in a radio section is to be set up or a new SAE bearer is to be established when starting communications with a certain external network.

Moreover, the mobile communication system according to the first embodiment of the present invention makes it possible to reduce the number of signals in a radio section as compared to the conventional way with GPRS since a connection to the Default IP Service is possible with only an MM procedure.

In addition, the mobile communication system according to the first embodiment of the present invention makes it possible to shorten a delay in establishing a connection to an external network as compared to the way with GPRS since no SM procedure is required.

The present invention has hereinbefore been described in detail using the embodiment above. It is apparent to those skilled in the art that the present invention is not limited to the embodiment described herein. The present invention may be carried out as modified or corrected forms without departing from the spirit and scope of the present invention defined by the appended claims. Therefore, the description of the present invention has been given for illustrative purposes only and is not intended to limit the present invention whatsoever.

Note that the entire content of Japanese Patent Application No. 2007-071634 (filed on Mar. 19, 2007) is incorporated herein by reference.

INDUSTRIAL APPLICABILITY

As described above, the present invention can provide a network registration method, a mobile station and a subscriber information management server which make it possible to quickly and safely start communications with an external network by completing a connection to the external network without unnecessarily occupying radio resources in a registration procedure to a communication network. Thus, the present invention is advantageous in radio communications such as mobile communications.

The invention claimed is:

1. A network registration method in which a mobile station performs a registration procedure to a communication network including a switching apparatus and a subscriber information management server, the network registration method comprising the steps of:
(A) transmitting, from the mobile station to the communication network, an attach request for starting the registration procedure;
(B) notifying, at the subscriber information management server, the switching apparatus of external network identification information which is identification information of an external network associated with the mobile station having transmitted the attach request, wherein the attach request does not include any information for identifying an external network;
(C) setting up, at the switching apparatus, a bearer between a gateway apparatus connected to the external network and the mobile station on the basis of a gateway apparatus identity corresponding to a default APN in the notified external network identification information;
(D) allocating, at the gateway apparatus, address information with which the mobile station connects to the external network, to the mobile station; and
(E) notifying, at the switching apparatus, the external network identification information and the address information, to the mobile station,
wherein in the step (E), the switching apparatus notifies the mobile station of the external network identification information and the address information through an attach response to the attach request.

2. The network registration method according to claim 1, wherein
in the step (B), the subscriber information management server notifies the switching apparatus of a plurality of pieces of external network identification information;
in the step (C), the switching apparatus sets up a bearer between the mobile station and each of a plurality of the gateway apparatuses respectively connected to a plurality of the external networks specified by the respective pieces of external network identification information thus notified;
in the step (D), each of the plurality of gateway apparatuses respectively allocate a piece of address information with which the mobile station connects to the corresponding one of the external networks, to the mobile station; and
in the step (E), the switching apparatus notifies the mobile station of the plurality of pieces of external network identification information and the pieces of address information.

3. The network registration method according to claim 2, wherein, in the step (B), the subscriber information management server determines the number or type of the pieces of external network identification information to be notified to the switching apparatus, depending on an ability of the mobile station.

4. The network registration method according to claim 2, wherein, in the step (B), the subscriber information management server determines the number or type of the pieces of external network identification information to be notified to the switching apparatus, depending on terms and conditions of a contract of the mobile station.

5. The network registration method according to claim 1, wherein, in the step (C), the switching apparatus sets up different bearers for respective types of communications to be performed by the mobile station.

6. A mobile station configured to perform a registration procedure to a communication network including a switching apparatus, the mobile station comprising:
an attach request transmitter unit configured to transmit an attach request to start the registration procedure to the communication network, wherein the attach request does not include any information for identifying an external network;
a communication information acquirer unit configured to acquire external network identification information which is identification information of an external network associated with the mobile station and address information associated with the mobile station from the switching apparatus, in the registration procedure to the communication network; and
a communicator unit configured to communicate with the external network by using the address information via a bearer set up between the mobile station and a gateway apparatus connected to the external network, wherein the bearer is set up on the basis of the gateway apparatus identity corresponding to a default APN in the external network identification information,
wherein the switching apparatus notifies the mobile station of the external network identification information and the address information through an attach response to the attach request.

7. The mobile station according to claim 6, wherein
in the registration procedure to the communication network, the communication information acquirer unit is configured to acquire a plurality of pieces of external network identification information for respectively identifying a plurality of external networks associated with the mobile station and a plurality of pieces of address information associated with the mobile station, from the switching apparatus; and by using one of the pieces of address information for one piece of external network identification information selected from the plurality of pieces of external network identification information, the communicator unit is configured to communicate with the selected external network via the bearer set up between the mobile station and the gateway apparatus connected to the selected external network.

8. The mobile station according to claim 6, wherein a plurality of different bearers are setup for respective types of communications to be performed with the gateway apparatus by the mobile station;

in the registration procedure to the communication network, the communication information acquirer unit is configured to further acquire a plurality of pieces of bearer identification information for respectively identifying the plurality of bearers, from the switching apparatus; and the communicator unit is configured to communicate with the external network via a bearer specified by one piece of bearer identification information selected from the plurality of pieces of bearer identification information in accordance with the type of communications.

9. A subscriber information management server used in a mobile communication system in which a mobile station performs a registration procedure to a communication network including a switching apparatus by transmitting an attach request, the subscriber information management server comprising:

a manager unit configured to store the mobile station and external network identification information which is identification information of an external network in association with each other; and a transmitter unit configured to notify the switching apparatus of the external network identification information associated with the mobile station having transmitted the attach request; wherein the attach request does not include any information for identifying an external network, and the transmitter unit is configured to determine the number or type of pieces of the external network identification information to be notified to the switching apparatus, depending on an ability of the mobile station.

10. A subscriber information management server used in a mobile communication system in which a mobile station performs a registration procedure to a communication network including a switching apparatus by transmitting an attach request, the subscriber information management server comprising:

a manager unit configured to store the mobile station and external network identification information which is identification information of an external network in association with each other; and a transmitter unit configured to notify the switching apparatus of the external network identification information associated with the mobile station having transmitted the attach request; wherein the attach request does not include any information for identifying an external network, and the transmitter unit is configured to determine the number or type of pieces of the external network identification information to be notified to the switching apparatus, depending on terms and conditions of a contract of the mobile station, the switching apparatus notifies the mobile station of the external network identification information and the address information through an attach response to the attach request, and a bearer between the mobile station and a gateway apparatus connected to the external network is set up on the basis of the gateway apparatus identity corresponding to a default APN in the external network identification information.

* * * * *